US012783671B2

(12) United States Patent
Rengan

(10) Patent No.: US 12,783,671 B2
(45) Date of Patent: Nov. 3, 2026

(54) AUTOMATICALLY GENERATING A SAFETY ENVIRONMENT FOR ANALYZING A SUSPECT DATA FILE

(71) Applicant: Lenovo Global Technology (United States) Inc., Morrisville, NC (US)

(72) Inventor: Marco M Rengan, Chapel Hill, NC (US)

(73) Assignee: Lenovo Global Technology (United States) Inc., Morrisville, NC (US)

(*) Notice: Subject to any disclaimer, the term of this patent is extended or adjusted under 35 U.S.C. 154(b) by 80 days.

(21) Appl. No.: 18/904,626

(22) Filed: Oct. 2, 2024

(65) Prior Publication Data

US 2026/0093812 A1 Apr. 2, 2026

(51) Int. Cl.
*G06F 21/00* (2013.01)
*G06F 21/53* (2013.01)
*G06F 21/56* (2013.01)

(52) U.S. Cl.
CPC ............ *G06F 21/568* (2013.01); *G06F 21/53* (2013.01)

(58) Field of Classification Search
None
See application file for complete search history.

(56) References Cited

U.S. PATENT DOCUMENTS 7,530,072 B1 * 5/2009 Cheaz .................... G06F 21/53 712/216
10,997,291 B2 * 5/2021 Dhankhar ............ G06F 21/554
11,741,222 B2 * 8/2023 McKerchar ............ G06F 21/53 726/22
2007/0106981 A1 * 5/2007 Bird ........................ G06F 21/56 717/127
2009/0070873 A1 * 3/2009 McAfee .................. G06F 21/56 726/22
2013/0111587 A1 * 5/2013 Goel ..................... G06F 21/577 726/25

(Continued)

OTHER PUBLICATIONS

Keen, "Gartner Unveils Top Eight Cybersecurity Predictions for 2023-2024", Gartner, Mar. 28, 2023, pp. 1-4, Sydney, Australia.

(Continued)

*Primary Examiner* — Maung T Lwin
(74) *Attorney, Agent, or Firm* — Kunzler Needham & Hilton; Bruce R. Needham

(57) ABSTRACT

A method for automatically generating a safety environment upon detection of a suspected malicious data file includes detecting, on a computing device, a suspect data file suspected of including code harmful to the computing device and/or a user and generating, via a request from the user, a safety environment accessible to the computing device. The safety environment is isolated from a user environment of the computing device where effects of accessing the suspect data file in the safety environment are isolated from the user environment of the computing device. The method includes performing one or more computing activities on the suspect data file within the safety environment that are configured to determine whether the suspect data file includes code harmful to the computing device and/or the user. The method includes receiving an exit signal to exit the safety environment and deactivating the safety environment in response to the exit signal.

18 Claims, 6 Drawing Sheets

(56) References Cited

U.S. PATENT DOCUMENTS

| | | | | |
|---|---|---|---|---|
| 2019/0311136 | A1* | 10/2019 | Pai | H04L 63/20 |
| 2020/0082081 | A1* | 3/2020 | Sarin | H04W 12/08 |
| 2023/0004639 | A1* | 1/2023 | Idrizovic | G06F 21/566 |
| 2024/0338443 | A1* | 10/2024 | Miller | G06F 21/566 |

OTHER PUBLICATIONS

Bouckaert et al., "7 trends that could shape the future of cybersecurity in 2030", World Economic Forum, Mar. 3, 2023, pp. 1-16.
"What is a Network Sandbox?" VMWARE Glossary by Broadcom, date downloaded Jun. 28, 2024, pp. 1-5.

* cited by examiner

AUTOMATICALLY GENERATING A SAFETY ENVIRONMENT FOR ANALYZING A SUSPECT DATA FILE

FIELD

The subject matter disclosed herein relates to detecting malicious files and more particularly relates to automatically activating a safety environment for detecting malicious files.

BACKGROUND

In an attempt to make computers more user friendly, much effort has been made to automatically detect malicious files, such as viruses, malware, ransomware, and the like. However, many tasks involve a system administrator taking action using tools available only to those with special privileges. Often typical users lack the skills for detecting malicious files.

BRIEF SUMMARY

A method for automatically generating a safety environment based on detection of a suspected malicious data file is disclosed. An apparatus and system also perform the functions of the method. The method includes detecting, on a computing device, a suspect data file suspected of including code harmful to the computing device and/or a user of the computing device and generating, in response to a request from the user, a safety environment accessible to the computing device. The safety environment is isolated from a user environment of the computing device where effects of accessing the suspect data file in the safety environment are isolated from the user environment of the computing device. The method includes performing one or more computing activities on the suspect data file within the safety environment. The one or more computing activities are configured to determine whether the suspect data file includes code harmful to the computing device and/or the user. The method includes receiving an exit signal to exit the safety environment and deactivating the safety environment in response to the exit signal.

An apparatus for automatically generating a safety environment based on detection of a suspected malicious data file includes a processor and non-transitory computer readable storage media storing code. The code is executable by the processor to perform operations that include detecting, on a computing device, a suspect data file suspected of including code harmful to the computing device and/or a user of the computing device, and generating, in response to a request from the user, a safety environment accessible to the computing device. The safety environment is isolated from a user environment of the computing device. Effects of accessing the suspect data file in the safety environment are isolated from the user environment of the computing device. The operations include performing one or more computing activities on the suspect data file within the safety environment. The one or more computing activities are configured to determine whether the suspect data file includes code harmful to the computing device and/or the user. The operations include receiving an exit signal to exit the safety environment, and deactivating the safety environment in response to the exit signal.

A system for automatically generating a safety environment based on detection of a suspected malicious data file includes a computing device that includes a processor and non-transitory computer readable storage media storing code. The code being executable by the processor to perform operations that include detecting, on the computing device, a suspect data file suspected of including code harmful to the computing device and/or a user of the computing device, and generating, in response to a request from the user, a safety environment accessible to the computing device. The safety environment is isolated from a user environment of the computing device where effects of accessing the suspect data file in the safety environment are isolated from the user environment of the computing device. The operations include performing one or more computing activities on the suspect data file within the safety environment. The one or more computing activities are configured to determine whether the suspect data file includes code harmful to the computing device and/or the user. The operations include receiving an exit signal to exit the safety environment, and deactivating the safety environment in response to the exit signal.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
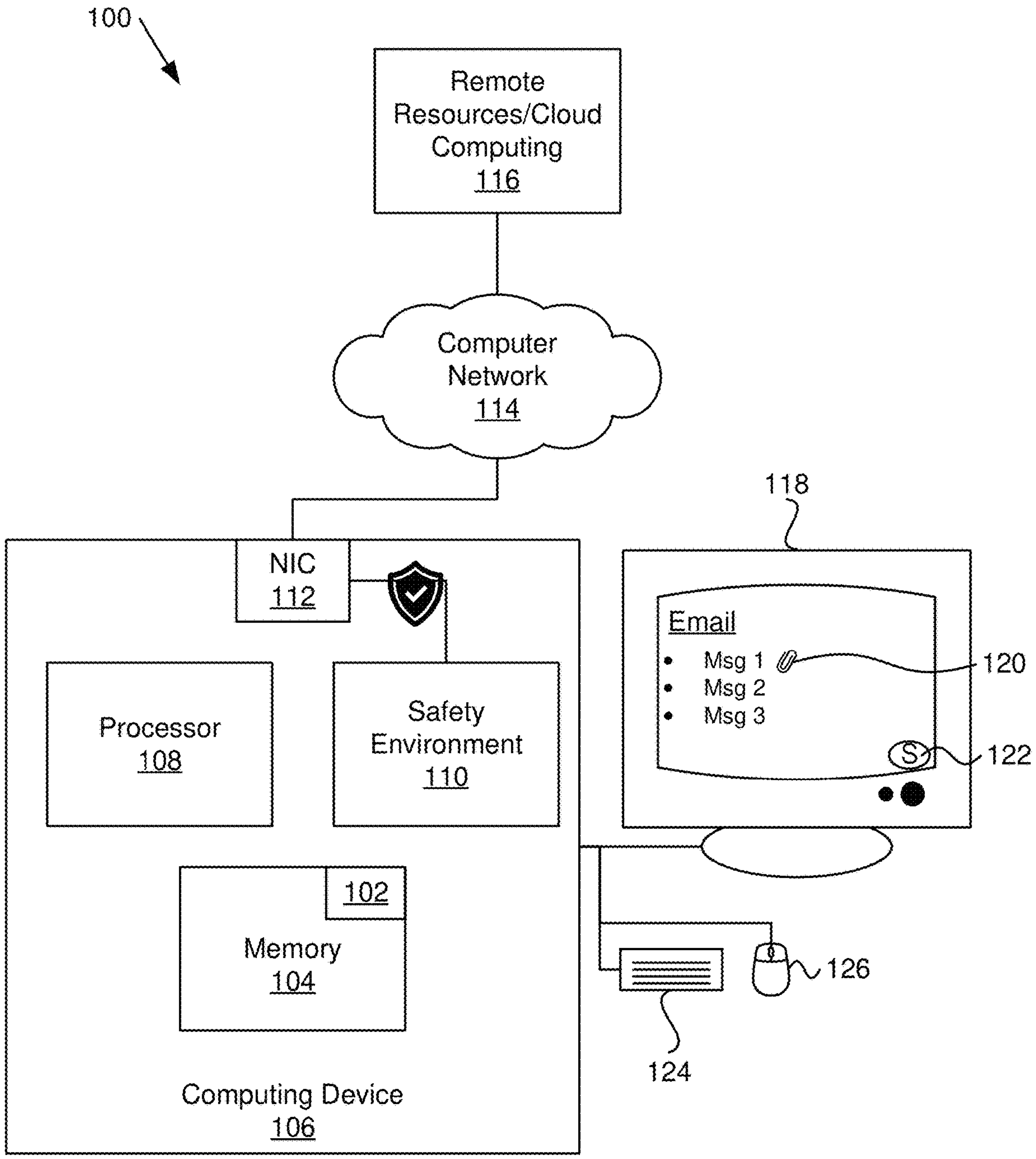
FIG. 1A is a schematic block diagram illustrating a system for automatically generating a safety environment on a computing device, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for automatically generating a safety environment based on detection of a suspected malicious data file is disclosed. An apparatus and system also perform the functions of the method. The method includes detecting, on a computing device, a suspect data file suspected of including code harmful to the computing device and/or a user of the computing device and generating, in response to a request from the user, a safety environment accessible to the computing device. The safety environment is isolated from a user environment of the computing device where effects of accessing the suspect data file in the safety environment are isolated from the user environment of the computing device. The method includes performing one or more computing activities on the suspect data file within the safety environment. The one or more computing activities are configured to determine whether the suspect data file includes code harmful to the computing device and/or the user. The method includes receiving an exit signal to exit the safety environment and deactivating the safety environment in response to the exit signal.

In some embodiments, the method includes isolating the suspect data file in the safety environment in response to a user action. In other embodiments, the request from the user to start the safety environment includes receiving an indication of the user selecting a soft key on an electronic display of the computing device or pressing a safe environment button. The safe environment button is available on a user interface of the computing device and/or on a case of the computing device.

In other embodiments, receiving the exit signal includes receiving an indication of user input selecting exiting the safety environment, where the user input indicates that the suspect data file is performing as expected in response to performing the one or more computing activities on the suspect data file. In other embodiments, receiving the exit signal includes receiving an indication from safety analysis software that the suspect data file is performing as expected in response to performing the one or more computing activities on the suspect data file. In other embodiments, the safety analysis software is configured to analyze results of performing the one or more computing activities on the suspect data file, to provide the indication that the suspect data file is performing as expected in response to the results being indicative of expected operation, and, in response to the results being indicative of abnormal operation harmful to the computing device and/or the user, to provide a warning that the suspect data file is not performing as expected where the warning is provided to the user and/or to a system administrator, and/or to disable further performing of computing activities on the suspect data file.

In other embodiments, the safety analysis software is configured to analyze the suspect data file to determine harmful impacts of the suspect data file to the computing device and/or to the user prior to the performing the one or more computing activities on the suspect data file, and, in response to the analysis of the suspect data file indicating potential harm to the computing device and/or the user, to provide a warning that the suspect data file is harmful to the computing device and/or the user where the warning is provided to the user and/or to a system administrator, and/or to disable further performing of computing activities on the suspect data file.

In some embodiments, the safety environment includes a virtual machine ("VM") that is operated on the computing device or a separate computing device accessible to the computing device. The VM prevents actions resulting from the performing of the one or more computing activities from affecting the computing device and/or another user environment of the computing device. In other embodiments, the safety environment executes on a separate computing device. The separate computing device prevents actions resulting from the performing of the one or more computing activities from affecting the computing device and/or other computing devices. In other embodiments, the safety environment enables one or more actions unavailable to the user in the safety environment prior to generating the safety environment, where the one or more actions include administrative actions available to a system administrator.

In some embodiments, the performing of the one or more computing activities on the suspect data file includes receiving user input indicating the one or more computing activities to be performed and further user input indicating whether results of the performing of the one or more computing activities represent expected results. In other embodiments, the receiving of the exit signal includes receiving a command in response to an interactive query resulting from the performing of the computing activities on the suspect data file. In other embodiments, the receiving of the exit signal includes expiration of a timer related to inactivity in the safety environment. The expiration of the timer causes the exit signal. In other embodiments, the detecting of the suspect data file includes receiving a communication from the user that the suspect data file is suspected of including code harmful to the computing device and/or a user.

An apparatus for automatically generating a safety environment based on detection of a suspected malicious data file includes a processor and non-transitory computer readable storage media storing code. The code is executable by the processor to perform operations that include detecting, on a computing device, a suspect data file suspected of including code harmful to the computing device and/or a user of the computing device, and generating, in response to a request from the user, a safety environment accessible to the computing device. The safety environment is isolated from a user environment of the computing device. Effects of accessing the suspect data file in the safety environment are isolated from the user environment of the computing device. The operations include performing one or more computing activities on the suspect data file within the safety environment. The one or more computing activities are configured to determine whether the suspect data file includes code harmful to the computing device and/or the user. The operations include receiving an exit signal to exit the safety environment, and deactivating the safety environment in response to the exit signal.

In some embodiments, the computer readable storage media stores further code executable by the processor to perform further operations that include receiving an indication of user input selecting exiting the safety environment where the user input indicates that the suspect data file is performing as expected in response to performing the one or more computing activities on the suspect data file. In other embodiments, the computer readable storage media stores further code executable by the processor to perform further operations that include receiving an indication from safety analysis software that is operating within the safety environment that the suspect data file is performing as expected in response to performing the one or more computing activities on the suspect data file. In other embodiments, the safety analysis software is configured to analyze results of performing the one or more computing activities on the suspect data file, provide the indication that the suspect data file is performing as expected in response to the results being indicative of expected operation, and, in response to the results being indicative of abnormal operation harmful to the computing device and/or the user, to provide a warning that the suspect data file is not performing as expected, where the warning is provided to the user and/or to a system administrator, and/or to disable further performing of computing activities on the suspect data file.

In some embodiments, the safety analysis software is configured to analyze the suspect data file to determine harmful impacts of the suspect data file to the computing device and/or to the user prior to the performing the one or more computing activities on the suspect data file, and in response to the analysis of the suspect data file indicating potential harm to the computing device and/or the user, to provide a warning that the suspect data file is harmful to the computing device and/or the user where the warning provided to the user and/or to a system administrator, and/or to disable further performing of computing activities on the suspect data file.

In some embodiments, the request from the user to start the safety environment includes receiving an indication of the user selecting a soft key on an electronic display of the computing device or pressing a safe environment button. The safe environment button is available on a user interface of the computing device and/or on a case of the computing device. In other embodiments, the safety environment includes a VM that is operated on one of the computing device and a separate computing device accessible to the computing device. The VM prevents actions resulting from the performing of the one or more computing activities from affecting the computing device and/or another user environment of the computing device. In other embodiments, the safety environment executes on a separate computing device, where the separate computing device prevents actions resulting from the performing of the one or more computing activities from affecting the computing device and/or other computing devices.

In other embodiments, the safety environment enables one or more actions unavailable to the user in the safety environment prior to generating the safety environment, the one or more actions including administrative actions available to a system administrator In other embodiments, the performing of the one or more computing activities on the suspect data file includes receiving user input indicating the one or more computing activities to be performed and further user input indicating whether results of the performing of the one or more computing activities represent expected results. In other embodiments, the receiving of the exit signal includes receiving a command in response to an interactive query resulting from the performing of the computing activities on the suspect data file. In other embodiments, the receiving of the exit signal includes expiration of a timer related to inactivity in the safety environment, where the expiration of the timer causes the exit signal.

A system for automatically generating a safety environment based on detection of a suspected malicious data file includes a computing device that includes a processor and non-transitory computer readable storage media storing code. The code being executable by the processor to perform operations that include detecting, on the computing device, a suspect data file suspected of including code harmful to the computing device and/or a user of the computing device, and generating, in response to a request from the user, a safety environment accessible to the computing device. The safety environment is isolated from a user environment of the computing device where effects of accessing the suspect data file in the safety environment are isolated from the user environment of the computing device. The operations include performing one or more computing activities on the suspect data file within the safety environment. The one or more computing activities are configured to determine whether the suspect data file includes code harmful to the computing device and/or the user. The operations include receiving an exit signal to exit the safety environment, and deactivating the safety environment in response to the exit signal.

FIG. 1A is a schematic block diagram illustrating a system 100 for automatically generating a safety environment 110 on a computing device 106, according to various embodiments. The system 100 includes a safety environment apparatus 102 in memory 104 of a computing device 106 that also includes a processor 108, a safety environment 110, and a network interface card ("NIC") 112, a computer network 114, a remote resources/cloud computing system 116, an electronic display 118 displaying a message with a suspect data file 120, a safety environment button launch 122, a keyboard 124, and a mouse 126, which are described below.

The safety environment apparatus 102 provides a way for a user to automatically generate a safety environment 110 on a computing device 106 to provide a safety environment 110 for inspecting a suspect data file 120 that might have a virus or may damage the computing device 106 and/or the user. As used herein, a suspect data file 120 includes a data file, an email, a data packet, text, or any other data structure received at, installed on, and/or available to the computing device 106. The suspect data file 120 is suspected by a user of the computing device 106 to include code that would be harmful to the user and/or the computing device.

The suspect data file 120 may damage a user by accessing sensitive information and transmitting the sensitive information to a person for malicious purposes, by installing malware, by installing ransomware to encrypt the user's files to extort the user, etc. In some embodiments, the safety environment apparatus 102 detects a suspect data file 120 on the computing device 106 and notifies the user where the suspect data file 120 may include code harmful to the computing device 106 and/or to the user of the computing device 106. Malware, viruses, and other code harmful to the user and/or to the computing device 106, as used herein, include any software, code, etc. intentionally designed to cause disruption to a computer, a server, a client, a computer network, leak private information, gain access to information, or which unknowingly interferes with a user's security and privacy.

The safety environment apparatus 102 may then start, in response to a request from the user, the safety environment 110 that is accessible to the computing device 106. The safety environment 110 is isolated from a user environment of the computing device 106 where effects of the accessing the suspect data file 120 in the safety environment 110 are isolated from the user environment of the computing device 106. Once the safety environment 110 is started, the safety environment apparatus 102 performs one or more computing activities on the suspect data file 120 within the safety environment 110 to determine whether the suspect data file 120 includes code harmful to the computing device 106 or user. The safety environment apparatus 102 receives an exit signal to exit the safety environment 110 and deactivates the safety environment in response to the exit signal.

The safety environment apparatus 102 provides a mechanism for a user to activate a safety environment 110 to check out whether or not a suspect data file 120 is safe to access and use without a need to contact an information technology ("IT") professional. Once the safety environment 110 is started, the user is able to access and execute the suspect data file 120 safely. For example, if the suspect data file 120 is a video file and attempting to play the video file results in a normal video play operation, the user may then be able to select to exit the safety environment 110 to enjoy the video of the video file. However, if the user attempts to play the video file and some other unintended action happens, the user is able to know that the suspect data file 120 is malicious or at least does not perform an expected action and the user can then take steps to avoid use of the suspect data file 120 in a normal operating condition. In some embodiments, the safety environment 110 includes tools for virus detection, recognizing malicious results of executing the suspect data file 120, and the like.

The computing device 106 includes a processor 108 and memory 104 coupled to the processor 108, which allows the processor 108 to access and run code from the safety environment apparatus 102. In some embodiments, the memory 104 is non-volatile memory. In other embodiments, the memory 104 is volatile memory. In other embodiments, the safety environment apparatus 102 is stored in non-volatile memory and called into volatile memory as needed for execution by the processor 108. In some embodiments, the non-volatile memory storing the safety environment apparatus 102 is external to the computing device 106.

The computing device 106, in various embodiments, includes a desktop computer, a laptop computer, a tablet computer, a smartphone, a smart appliance, a workstation, or other computing device that is used by a person (user). In some embodiments, the user is a non-IT professional and the embodiments described herein enable this non-IT professional to enable the safety environment 110 and safely perform actions on the suspect data file 120.

The safety environment 110, in the embodiments depicted in FIG. 1A, resides on the computing device 106. While the safety environment 110 is depicted as a box in FIG. 1A, one of skill in the art will recognize that the safety environment 110 is a logical construct that may include a virtual machine ("VM"), a container, or other environment designed to be isolated from other operations of the computing device 106 so that actions of the suspect data file 120 are prevented from causing damage to the computing device 106, from causing damage to software, from copying code to a location on the computing device 106 for malicious purposes, from accessing an external computer network 114, or the like. In some embodiments, the safety environment 110 includes a firewall that blocks access to computing resources external to the safety environment 110.

The computing device 106 includes a NIC 112 configured to connect the computing device 106 to remote resources and/or a cloud computing system 116 or other locations, such as other computers, the internet, and the like. The NIC 112, in some embodiments, is isolated from the safety environment 110, indicated by a shield, to prevent the suspect data file 120 executing in the safety environment 110 from accessing the computer network 114.

The computer network 114, in various embodiments, includes a LAN, a WAN, a public network, a wireless connection, a private network, or any combination thereof. The computer network 114 includes cabling, routers, switches, network controllers, and other equipment used in a computer network 114. The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

The remote resources 116 may include websites available on the internet, a computing device within a same facility as the computing device 106, or any other computing device typically accessible by a computing device 106 over a computer network 114. In some embodiments, the computing device 106 is a client and is able to access servers of a cloud computing system 116 to perform computing tasks on behalf of the client. The remote resources/cloud computing system 116 represents all computing devices and systems accessible to the computing device 106 over a computer network 114.

The system 100 typically includes an electronic display 118 in communication with the computing device 106, along with a keyboard 124, a mouse 126, or other input/output device. The electronic display 118 capable of displaying a home screen, applications, etc. In some embodiments, a user may be viewing emails within an email program and may notice an email with a suspect data file 120. In some examples, the suspect data file 120 is not a trusted file or a file that the user would recognize as malicious, but may be a data file where the user has concerns about whether or not the suspect data file 120 is malicious. In the depicted embodiment, the electronic display 118 is displaying a safety environment launch button 122, which is a soft button accessible to the user and is accessed via the mouse 126 or keyboard 124. In other embodiments, the suspect data file 120 is available over a file management system where the suspect data file 120 is connected via a removable drive, such as a universal serial bus ("USB") flash drive, available over the computer network 114, or the like. In other embodiments, the computing device 106 includes a hardware button to launch the safety environment 110.

Figure 1B:
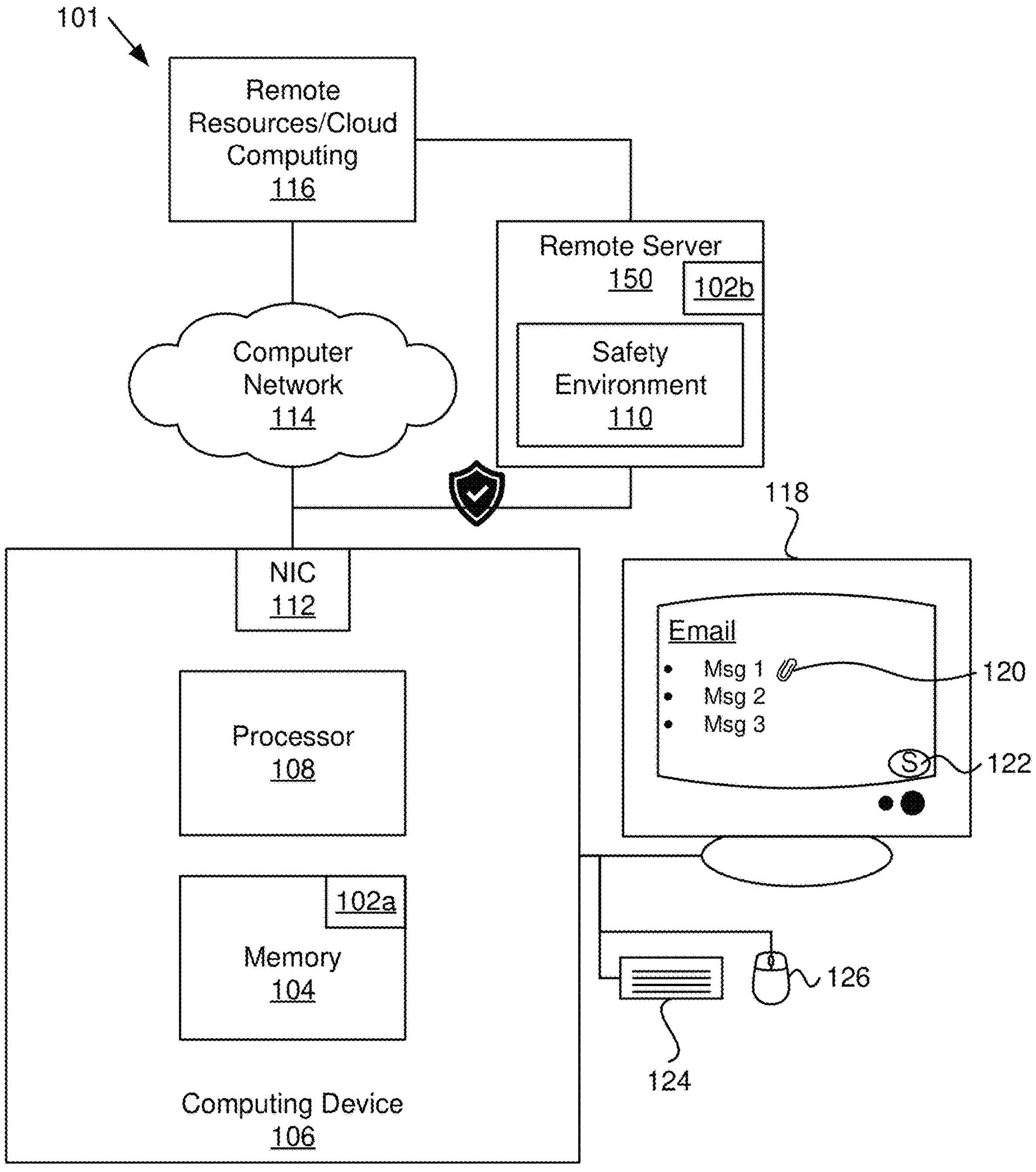
FIG. 1B is a schematic block diagram illustrating a system for automatically a safety environment separate from a computing device, according to various embodiments.

FIG. 1B is a schematic block diagram illustrating a system 101 for automatically generating a safety environment 110 separate from a computing device 106, according to various embodiments. The system 101 of FIG. 1B along with the memory 104, the processor 108, the computing device 106, NIC 112, computer network 114, remote resources/cloud computing system 116, electronic display 118, keyboard 124, mouse 126, suspect data file 120, and safety environment launch button 122 are substantially similar to those of the system 100 of FIG. 1A. In the system 101, the safety environment 110 is located in a remote server 150 where a first portion of the safety environment apparatus 102*a* is located in memory 104 of the computing device 106 and a second portion of the safety environment apparatus 102*b* is located in memory on the remote server 150.

In the embodiments of the system 101 of FIG. 1B, the first portion of the safety environment apparatus 102*a* facilitates the user detecting/identifying the suspect data file 120 and launching the safety environment 110 on the remote server 150. The second portion of the safety environment apparatus 102*b* facilitates operations within the safety environment 110, such as performing one or more computing activities on the suspect data file 120 within the safety environment, determining that the suspect data file 120 is malicious, determining that the suspect data file 120 is safe, generating and/or receiving an exit signal to exit the safety environment 110, and deactivating the safety environment 110. Note that action described above performed by the first and second portions of the safety environment apparatuses 102*a*, 102*b* are merely presented to denote that a portion of code is located on or accessible to the computing device 106 and a portion of code is located or accessible to the remote server 150. One of skill in the art will recognize other ways to implement portions of the safety environment apparatus 102 between the computing device 106 and the remote server 150.

Figure 2:
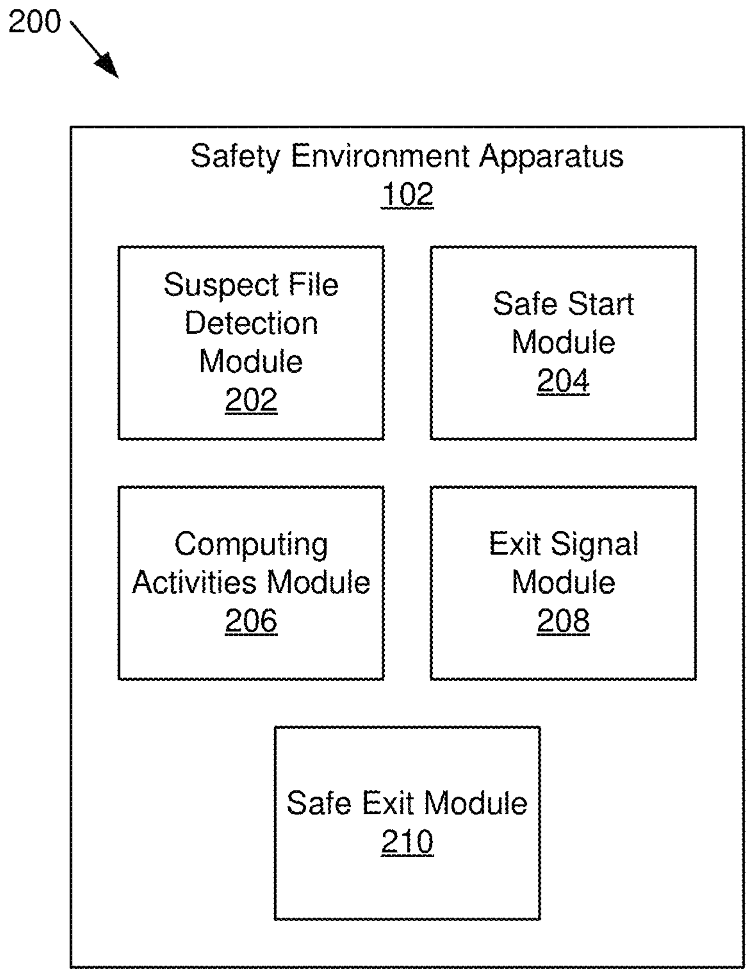
FIG. 2 is a schematic block diagram illustrating an apparatus for generating and using a safety environment, according to various embodiments.

FIG. 2 is a schematic block diagram illustrating an apparatus 200 for generating and using a safety environment, according to various embodiments. The apparatus 200 includes a safety environment apparatus 102 with a suspect file detection module 202, a safe start module 204, a computing activities module 206, an exit signal module 208, and a safe exit module 210, which are described below. In some embodiments, the apparatus 200 is implemented using code stored on a computer readable storage device, which is non-transitory. In other embodiments, all or a portion of the apparatus 200 is implemented with a programmable hardware device and/or hardware circuits, such as a button for activating the safety environment 110.

The apparatus 200 includes a suspect file detection module 202 configured to detect, on the computing device 106, a suspect data file 120 suspected of including code harmful to the computing device 106 and/or a user of the computing device 106. In some embodiments, the suspect file detection module 202 detects the suspect data file 120 in response to the user providing an identification of the suspect data file 120. In some examples, the user right-clicks on the suspect data file 120 and an option appears to identify a file as the suspect data file 120. In other embodiments, the suspect file detection module 202 detects the suspect data file 120 when the user drags a data file to an area on the electronic display 118 designated for identifying files as suspect data files 120, such as the safety environment launch button 122. In other embodiments, the suspect file detection module 202 detects the suspect data file 120 when the user identifies an email with an attachment as suspect. In other embodiments, the user accesses one or more files external to the computing device 106, such as on a USB drive, a network drive, etc. One of skill in the art will recognize other ways for the suspect file detection module 202 to recognize actions by the user to identify the suspect data file 120.

The apparatus 200 includes a safe start module 204 configured to start, in response to a request from the user, a safety environment 110 that is accessible to the computing device 106. The safety environment 110 is isolated from a user environment of the computing device 106 where effects of accessing the suspect data file 120 in the safety environment 110 are isolated from the user environment of the computing device 106. As used herein, the user environment is an operating condition outside of the safety environment 110 where execution of code, accessing files, and the like results in typical computer operations, such as communicating over the computer network 114, accessing and running applications, and the like. In the user environment, accessing, executing, etc. the suspect data file 120 may result in actions detrimental to the user and/or to the computing device 106. In some embodiments, the safe start module 204 generating the safety environment 110 isolates the suspect data file 120 within the safety environment 110. In other embodiments, the user performs an action to move the suspect data file 120 into the safety environment 110 to isolate the suspect data file 120.

In some embodiments, the safe start module 204 creates a window that is designated as the safety environment 110. In some embodiments, the safety environment 110 is in a virtual machine and the safe start module 204 starts the virtual machine that includes the safety environment 110. In other embodiments, the safe start module 204 generating the safety environment 110 causes an icon or other indicator on the electronic display 118 indicating that the safety environment 110 is active. In some embodiments, while the safety environment 110 is active, all windows, applications, etc. on the electronic display 118 are part of the safety environment 110.

In some embodiments, the safe start module 204 starts the safety environment 110 on a separate remote server 150 that is accessible to the computing device 106, as depicted in the system 101 of FIG. 1B. In the embodiments, the computing device 106 may be a client to the remote server 150. In other embodiments, the safe start module 204 creates a portal to the safety environment 110 on the remote server 150 and actions by the user and/or computing device 106 are directed to the safety environment 110 on the remote server 150 so that accessing the suspect data file 120 is isolated to the safety environment 110. In the embodiment with the safety environment 110 on the remote server 150, computing activities on the suspect data file 120 are isolated from the computing device 106 and other computing devices, such as the remote resources and cloud computing system 116. In the embodiment with the safety environment 110 on the remote server 150, some or all of the safe start module 204 and possibly other modules 202, 206, 208, 210 are located on the remote server 150.

The apparatus 200 includes a computing activities module 206 configured to perform one or more computing activities on the suspect data file 120 within the safety environment 110. The one or more computing activities are configured to determine whether the suspect data file 120 includes code harmful to the computing device 106 and/or the user. In some embodiments, the computing activities include the user attempting to open or run the suspect data file 120. In some examples, the suspect data file 120 may appear to be a video file and the user may attempt to watch the video file. In the case that the user accessing the suspect data file 120 appearing to be a video file results in an expected video playing on electronic display 118, the user may conclude that the suspect data file 120 is safe. In other embodiments, the computing activities include execution or attempted execution of the suspect data file 120.

Where the user accessing the suspect data file 120 as a video and the result is some other action different than the expected video playback, the user may conclude that the suspect data file 120 includes code harmful to the user or the computing device 106. In other examples, the suspect data file 120 may appear to be a spreadsheet, a file with text, etc. The suspect data file 120 may include an extension matching with a known data type. The user may open a suspect data file 120 with an extension indicative of a spreadsheet and a spreadsheet may or may not appear. Where the spreadsheet does not appear, the user may conclude that the suspect data file 120 is harmful. Where the spreadsheet appears as expected, the user may conclude that that the suspect data file 120 is not harmful.

In other embodiments, the computing activities include analyzing the suspect data file 120, which may take various forms. In some examples, the safety environment 110 enables the user to access one or more actions unavailable to the user prior to generating the safety environment 110. In some embodiments, the one or more actions include administrative actions available to a system administrator In some embodiments, the apparatus 200 includes safety analysis software 304 that analyzes results of the user accessing the suspect data file 120 to identify results that are not expected even when expected results appear on the electronic display 118. In some examples, the safety analysis software 304 identifies resulting from executing, accessing, etc. the suspect data file 120 that would be invisible to the user. In some embodiments, function of the safety analysis software 304 are available to the user. The safety analysis software 304 is discussed below in more detail with regard to the apparatus 300 of FIG. 3.

The apparatus 200 includes an exit signal module 208 configured to receive an exit signal from the safety environment 110 and a safe exit module 210 configured to deactivate the safety environment in response to the exit signal. In the embodiments, the exit signal module 208 receives the exit signal from the user. In some embodiments, the safety environment 110 includes display of an exit button on the electronic display 118, which is a software generated button. In other embodiments, the computing device 106 includes a hardware button, which may be dedicated or assignable, that is for the user to send the exit signal received by the exit signal module 208. The hardware button, in some embodiments, is on the keyboard 124 or on a computer case for the computing device 106. In some embodiments, the exit signal module 208 receives an exit signal from the safety analysis software 304.

In some embodiments, the safe exit module 210 exits, shuts down, disables, etc. the safety environment 110 during deactivation. In some embodiments, the safe exit module 210 allows and/or causes the computing device 106 to resume normal operation in the user environment after deactivation of the safety environment. In some embodiments, the safe exit module 210 activates external communication resulting from user actions, resulting from executing or accessing the suspect data file 120, or the like that was prevented during execution of the safety environment 110. In some embodiments, the safe exit module 210 enables access to files, applications, etc. that were prohibited during operation of the safety environment 110. In some embodiments, the safe exit module 210 causes a virtual machine hosting the safety environment 110 to shut down.

Figure 3:
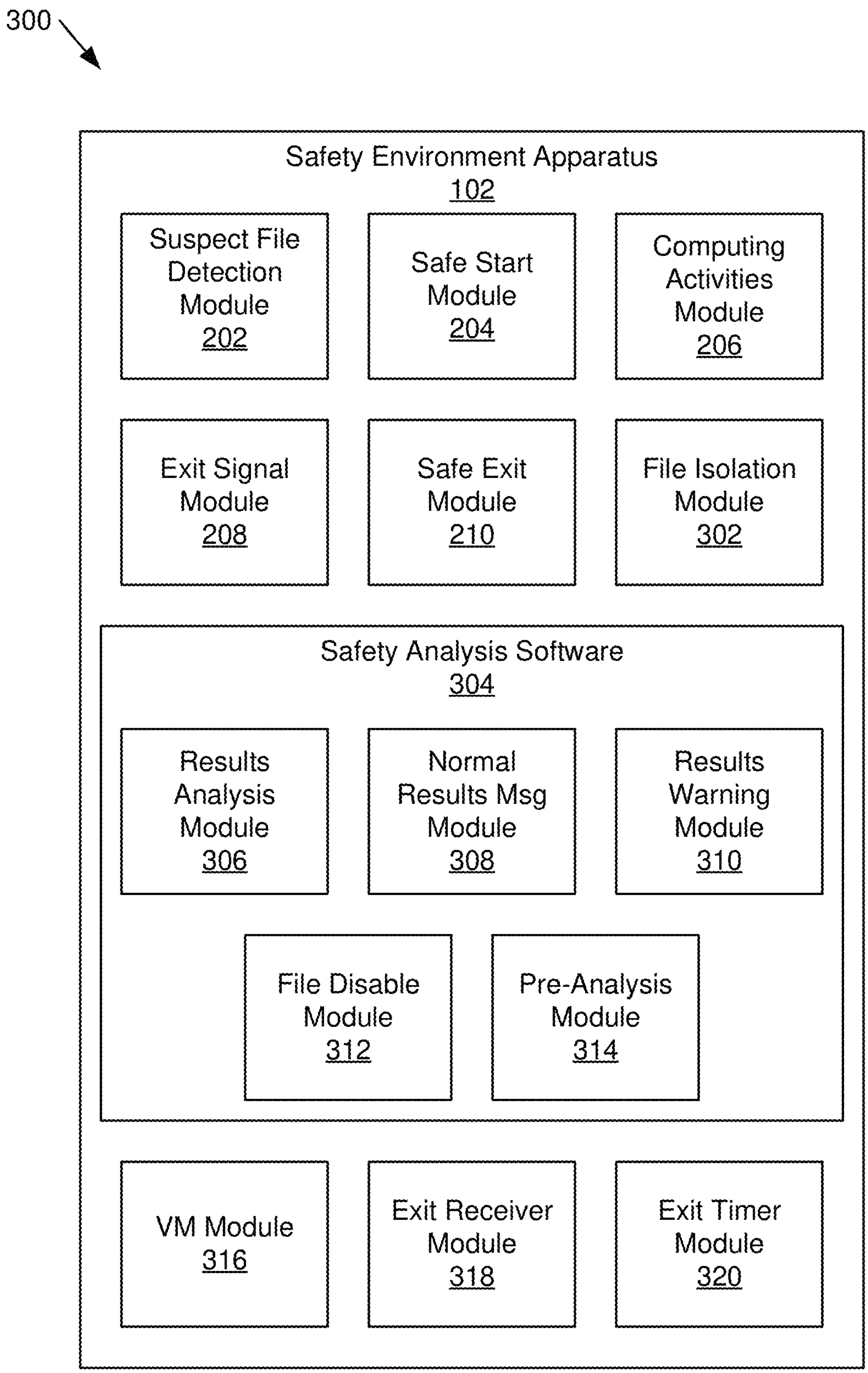
FIG. 3 is a schematic block diagram illustrating another apparatus for generating and using a safety environment, according to various embodiments.

FIG. 3 is a schematic block diagram illustrating another apparatus 300 for generating and using a safety environment, according to various embodiments. The apparatus 300 includes another safety environment apparatus 102 with a safety environment apparatus 102 with a suspect file detection module 202, a safe start module 204, a computing activities module 206, an exit signal module 208, and a safe exit module 210, which are substantially similar to those described above in relation to the apparatus 200 of FIG. 2. In various embodiments, the safety environment apparatus 102 includes a file isolation module 302, safety analysis software 304 with a results analysis module 306, a normal results message module 308, a results warning module 310, a file disable module 312, and a pre-analysis module 314, a virtual machine module 316, an exit receiver module 318, and an exit timer module 320, which are described below. In various embodiments, the apparatus 300 is implemented similar to the apparatus 200 of FIG. 2.

The apparatus 300, in some embodiments, includes a file isolation module 302 configured to isolate the suspect data file 120 in the safety environment 110. In some embodiments, the file isolation module 302 isolates the suspect data file 120 in response to generating the safety environment 110 and prior to performing the one or more computing activities on the suspect data file 120. In some embodiments, the file isolation module 302 works separately from or in conjunction with actions of a user to isolate the suspect data file 120. In some embodiments, the file isolation module 302 isolates the suspect data file 120 when the suspect data file 120 is moved to a window of the safety environment 110 on the electronic display 118. In other embodiments, the file isolation module 302 isolates the suspect data file 120 upon startup of the safety environment 110 where the suspect data file 120 was previously identified as being a suspect data file 120.

In other embodiments, the file isolation module 302 isolates the suspect data file 120 when moved to a designated quarantine area. In various embodiments, the quarantine area is an area reserved for analysis of suspect data files 120 and may be partitioned off from other files, may be inaccessible except for the safety analysis software 304, etc. In other embodiments, the file isolation module 302 isolates the suspect data file 120 by marking the suspect data file 120, by adding metadata to a header of the suspect data file 120, or the like to keep the suspect data file isolated. In some embodiments, having the suspect data file 120 isolated means that the suspect data file 120 is in a position with respect to the safety environment 110 that selection, execution, etc. of the suspect data file 120 as well as subsequent actions caused by the suspect data file 120 are isolated from causing harm to the user and/or computing device 106.

The apparatus 300, in various embodiments, includes safety analysis software 304 configured to analyze the suspect data file 120 and/or to analyze actions caused by execution of the suspect data file 120 for potential harm to the user and/or to the computing device 106. In some embodiments, the safety analysis software 304 includes virus protection software designed to analyze code of the suspect data file 120 to identify any malicious code. In other embodiments, the safety analysis software 304 works in conjunction with the safety environment 110 to identify commands, file access, network access, etc. initiated by the suspect data file 120 once the suspect data file 120 has been accessed or executed where the identified commands, file access, network access, etc. are possibly harmful to the user and/or the computing device 106.

In some embodiments, the safety analysis software 304 is configured to provide an indication that the suspect data file is performing as expected or is performing not as expected in response to the computing activities module 206 performing the one or more computing activities on the suspect data file 120. The indication, in some embodiments, is the exit signal used by the exit signal module 208 to trigger the safe exit module 210 to exit the safety environment 110. In some embodiments, all or a portion of the safety analysis software 304 is operated by the user.

In some embodiments, the safety analysis software 304 includes a results analysis module 306 configured to analyze results of performing the one or more computing activities on the suspect data file 120. In some embodiments, the results analysis module 306 intercepts commands, file access, network access, etc. by the suspect data file 120 for analysis and then makes a determination as to whether the commands, file access, network access, etc. are harmful or not. In some embodiments, the safety analysis software 304 executes the one or more computing activities.

In some embodiments, the safety analysis software 304 includes a normal results message module 308 configured to generate the indication that the suspect data file 120 is performing as expected in response to the results analysis module 306 determining that the suspect data file 120 is performing as expected. In some embodiments, the normal results message module 308 sends the indication of normal performance to the exit signal module 208. In other embodiments, the normal results message module 308 is configured to send a message to the user, to a system administrator, a log file, etc. that indicates that the suspect data file 120 is performing as expected. In some embodiments, the user then provides the exit signal to the exit signal module 208 after receiving the message from the normal results message module 308 that the suspect data file 120 is operating normally.

In some embodiments, the safety analysis software 304 includes a results warning module 310 configured to provide a warning that the suspect data file is not performing as expected, in response to the results analysis module 306 determining that results from the one or more computing activities of the suspect data file 120 are harmful to the user and/or to the computing device 106. In some embodiments, the results warning module 310 transmits the warning to the user, to a system administrator, a log file, etc.

In some embodiments, the safety analysis software 304 includes a file disable module 312 configured to disable further performing of computing activities on the suspect data file 120. In some embodiments, the file disable module 312 places the suspect data file 120 in a quarantine area or similar location designated to hold harmful data files. In other embodiments, the file disable module 312 deletes the suspect data file 120 to prevent harm to the user and/or the computing device 106. In other embodiments, the file disable module 312 modifies code of the suspect data file 120 that renders the suspect data file 120 safe. One of skill in the art will recognize other ways for the file disable module 312 to disable the suspect data file 120 from performing further computing activities on the suspect data file 120.

In some embodiments, the safety analysis software 304 includes a pre-analysis module 314 configured to analyze the suspect data file 120 to determine harmful impacts of the suspect data file 120 to the computing device 106 and/or to the user prior to the performing the one or more computing activities on the suspect data file 120. In some embodiments, the pre-analysis module 314 analyzes code of the suspect data file 120 to identify a virus, ransomware, or the like prior to performing the one or more computing activities. In other embodiments, the pre-analysis module 314 accesses another program, such as a virus protection application, to analyze the code of the suspect data file 120 to identify a virus, ransomware, or the like prior to performing the one or more computing activities. In some embodiments, the user activates the pre-analysis module 314. In response to the analysis of the pre-analysis module 314 indicating potential harm to the user and/or computing device 106, the results warning module 310, in some embodiments, provides the warning that the suspect data file 120 is not performing as expected to the user, to a system administrator, etc.

In response to the analysis of the pre-analysis module 314 indicating that the suspect data file 120 is safe, in some embodiments, the normal results message module 308 sends a message to the user, to a system administrator, to a log file, etc. that the suspect data file 120 is safe. In response to the analysis of the pre-analysis module 314 indicating that the suspect data file 120 is harmful, in some embodiments, the results warning module 310 sends a warning message or other action to the user, system administrator, log file, etc. that the suspect data file 120 is harmful.

In some embodiments, the apparatus 300 includes a virtual machine module 316 configured to start a virtual machine ("VM") or container that is operated on the computing device 316 and/or the remote server 150 accessible to the computing device 106 where the VM or container prevents actions resulting from the performing of the one or more computing activities from affecting the computing device 106 and/or another user environments of the computing device 106. In some embodiments, the virtual machine module 316 starts the VM or container prior to the safe start module 204 generating the safety environment 110 on the VM or container. In some embodiments, the VM or container includes a separate instance of an operating system and includes firewalls and other isolating features to isolate the safety environment 110 from other operations of the computing device 106.

In some embodiments, the apparatus 300 includes an exit receiver module 318 configured to receive a command from the user to exit the safety environment 110 in response to the user selecting to exit the safety environment 110. In some embodiments, the user selects to exit the safety environment 110 by selecting a software button on the electronic display 118. In other embodiments, the user selects to exit the safety environment 110 by accessing a button or similar device on the computing device 106. The button or similar device, in some embodiments, includes a programmable button on a keyboard 124, a case of the computing device 106, or the like.

In other embodiments, the user selects to exit the safety environment 110 in response to an interactive query resulting from the performing of the computing activities on the suspect data file 120. In some examples, a message from the normal results message module 308 is in the form of an interactive query, such as an exit message stating that the suspect data file 120 is operating normally and asking the user if the user wants to exit the safety environment 110 and the exit receiver module 318 receives a selection associated with the exit message from the user. In various embodiments, the exit receiver module 318 interacts with exit signal module 208 to receive the exit signal from the user.

In some embodiments, the apparatus 300 includes an exit timer module 320 configured to start an inactivity timer related to user activity in the safety environment 110 and is configured to provide an exit signal to the exit signal module 208 in response to not detecting user input or other user activity while in the safety environment 110 for a specified period of time. The inactivity timer, in some embodiments, is configured to automatically return to normal operation in the user environment when there is no activity by the user for a specified period of time.

Figure 4:
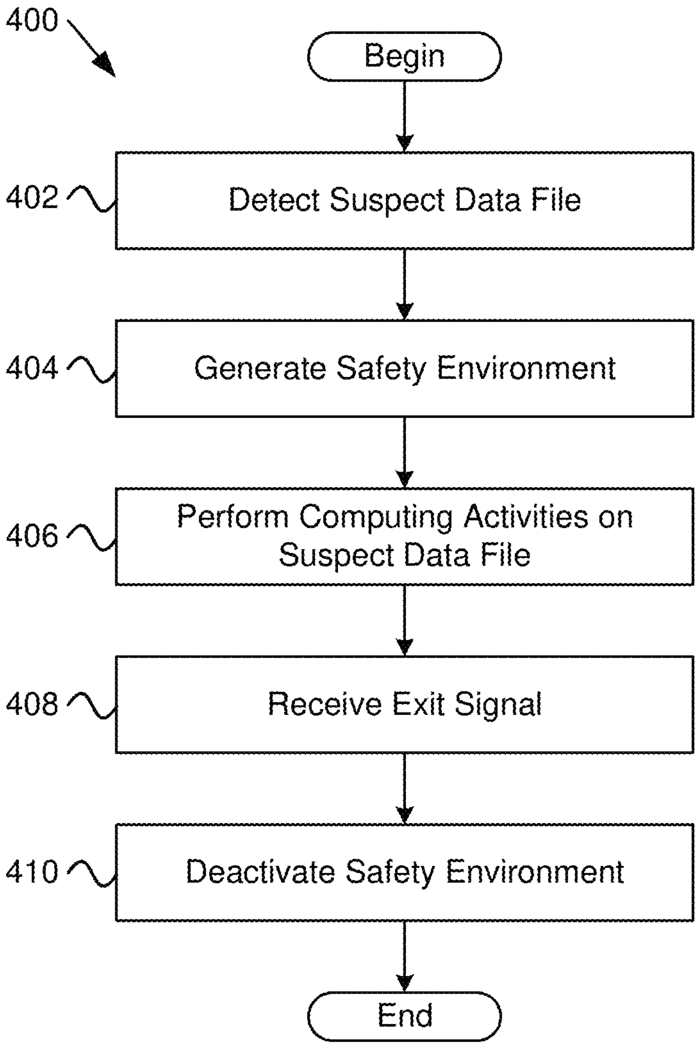
FIG. 4 is a schematic block diagram illustrating a method for generating and using a safety environment, according to various embodiments.

FIG. 4 is a schematic block diagram illustrating a method 400 for generating and using a safety environment, according to various embodiments. The method 400 begins and detects 402, on a computing device 106, a suspect data file 120 suspected of including code harmful to the computing device 106 and/or a user of the computing device 106. In some embodiments, the method 400 detects 402 a suspect data file 120 based on receiving an indication of user input indicating that a data file is s suspect data file 120. The method 400 starts 404, in response to a request from the user, a safety environment 110 accessible to the computing device 106. The safety environment 110 is isolated from a user environment of the computing device 106 and effects of accessing the suspect data file 120 in the safety environment 110 are isolated from the user environment of the computing device 106.

The method 400 performs 406 one or more computing activities on the suspect data file 120 within the safety environment 110 where the one or more computing activities are configured to determine whether the suspect data file 120 includes code harmful to the computing device 106 and/or the user. The method 400 receives 408 an exit signal to exit the safety environment 110 and deactivates 410 the safety environment 110, and the method 400 ends. In some embodiments, the method 400 receives the exit signal based on receiving user input, such as the user selecting an exit button or other command from the user. In various embodiments, all or a portion of the method 400 is implemented using the suspect file detection module 202, the safe start module 204, the computing activities module 206, the exit signal module 208, and/or the safe exit module 210.

Figure 5:
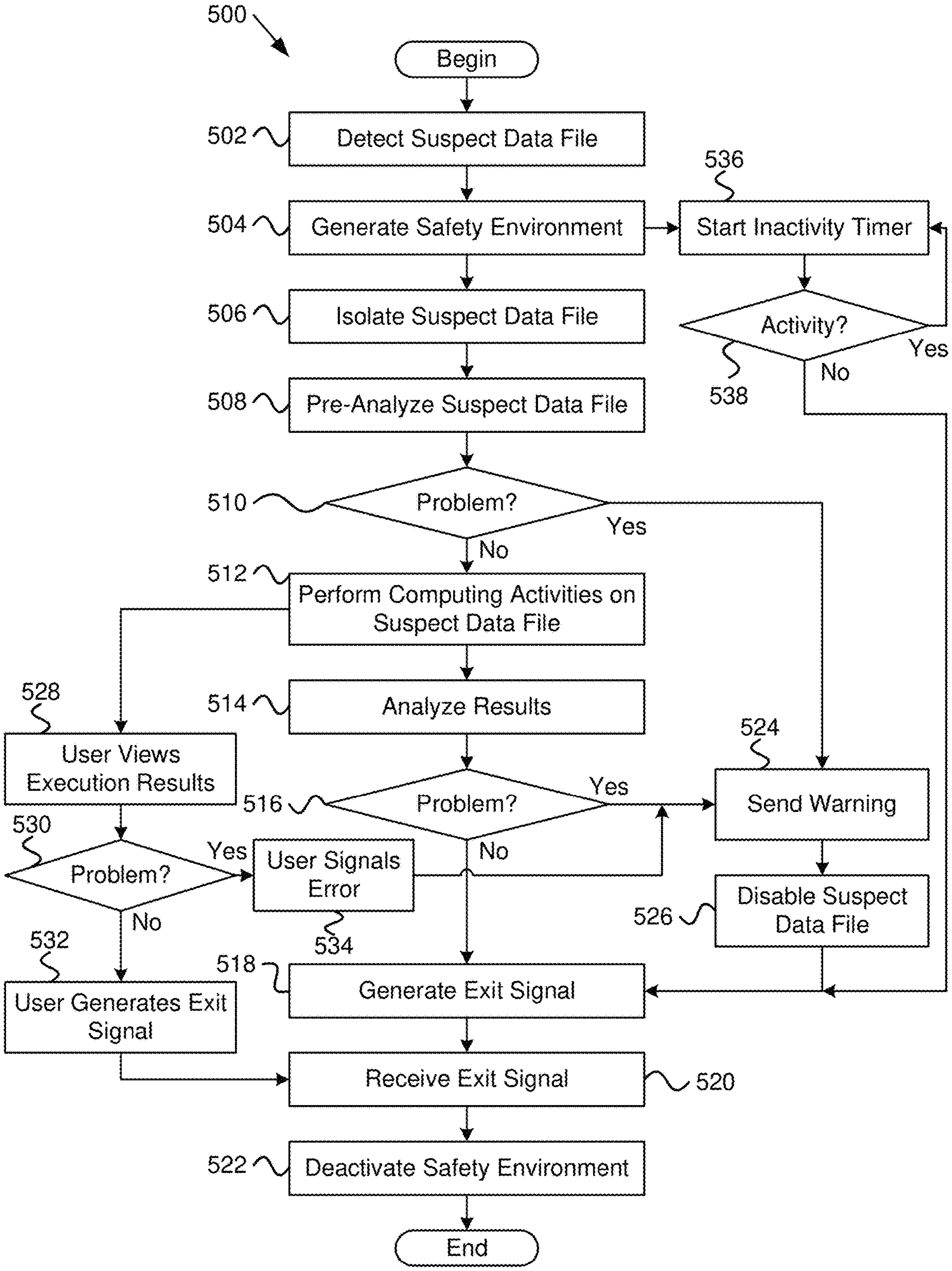
FIG. 5 is a schematic block diagram illustrating another method for generating and using a safety environment, according to various embodiments.

FIG. 5 is a schematic block diagram illustrating another method 500 for generating and using a safety environment, according to various embodiments. The method 500 begins and detects 502, on a computing device 106, a suspect data file 120 suspected of including code harmful to the computing device 106 and/or a user of the computing device 106. In some embodiments, the method 500 detects 502 a suspect data file 120 based on receiving user input indicating that a data file is s suspect data file 120. The method 500 starts 504, in response to a request from the user, a safety environment 110 accessible to the computing device 106. The safety environment 110 is isolated from a user environment of the computing device 106 and effects of accessing the suspect data file 120 in the safety environment 110 are isolated from the user environment of the computing device 106.

The method 500 isolates 506 the suspect data file 120 in the safety environment 110 and pre-analyzes 508 the suspect data file 120 to determine harmful impacts of the suspect data file 120 to the computing device 106 and determines 510 if the suspect data file 120 includes code harmful to the user and/or to the computing device 106, such as containing a virus, malware, ransomware, etc. If the method 500 fails to determine 510 that the suspect data file 120 includes code harmful to the user and/or to the computing device 106, the method 500 performs 512 one or more computing activities on the suspect data file 120 within the safety environment 110 where the one or more computing activities are configured to determine whether the suspect data file 120 includes code harmful to the computing device 106 and/or the user. The method 500 analyzes 514 results of performing the one or more computing activities on the suspect data file 120, and determines 516 if the results indicate that the suspect data file 120 is harmful to the user and/or to the computing device 106.

If the method 500 determines 516 that the results indicate that the suspect data file 120 is not harmful to the user and/or to the computing device 106, for example, from the user viewing results of execution or accessing the suspect data file 120 or the safety analysis software 304 determining that the results indicate that the suspect data file 120 is not harmful to the user and/or to the computing device 106, the method 500 generates 518 an exit signal. The method 500 receives 520 the exit signal and deactivates 522 the safety environment 110 allowing the computing device 106 to run normally, and the method 500 ends.

If the method 500 determines 510, based on the pre-analysis, that the suspect data file 120 includes code harmful to the computing device 106 and/or to the user, the method 500 sends 524 a warning, disables 526 performing further computing activities on the suspect data file 120, and the method 500 generates 518 the exit signal, receives 520 the exit signal, and deactivates 522 the safety environment 110, and the method 500 ends.

In some embodiments, after the method 500 performs the one or more computing activities on the suspect data file

120, the user views 528 the execution results and determines 530 if the execution results indicate that the suspect data file 120 includes code that is harmful to the user and/or to the computing device 106. If the user determines 530 that the execution results are normal so the suspect data file 120 does not include code harmful to the user and/or to the computing device 106, the user generates 532 an exit signal, which is received 520 by the method 500, which deactivates 522 the safety environment 110, and the method 500 ends. If the user determines 530 that the execution results indicate that the suspect data file 120 includes code harmful to the user and/or to the computing device 106, the user signals 534 an error, meaning that the suspect data file 120 includes code harmful to the user and/or computing device 106, and the method 500 sends 524 a warning and disables 526 performing further computing activities on the suspect data file 120. The method 500 generates 518 the exit signal, receives 520 the exit signal, and deactivates 522 the safety environment 110, and the method 500 ends.

In some embodiments, upon the method 500 generating 504 the safety environment 110, the method 500 starts 536 an inactivity timer and senses 538 user activity relative to the safety environment 110, such as commands, movement of the mouse 126, keyboard 124 strokes, etc. If the method 500 senses 538 user activity relative to the safety environment 110, the method 500, restarts 536 the inactivity timer. If the method 500 does not sense 538 user activity before expiration of the activity timer, the method 500 generates 518 an exit signal, receives 520 the exit signal, and deactivates 522 the safety environment 110, and the method 500 ends. In various embodiments, all or a portion of the method 500 is implemented using the suspect file detection module 202, the safe start module 204, the computing activities module 206, the exit signal module 208, the safe exit module 210, the file isolation module 302, the safety analysis software 304, the results analysis module 306, the normal results message module 308, the results warning module 310, the file disable module 312, the pre-analysis module 314, the virtual machine module 316, the exit receiver module 318, and the exit timer module 320.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

detecting, on a computing device, a suspect data file suspected of comprising code harmful to the computing device and/or a user of the computing device;

activating, in response to a request from the user, a safety environment accessible to the computing device, the safety environment isolated from a user environment of the computing device, wherein effects of accessing the suspect data file in the safety environment are isolated from the user environment of the computing device;

pre-analyzing, within the safety environment, the suspect data file to determine harmful impacts of the suspect data file to the computing device and/or to the user of the computing device;

in response to finding no harmful impacts of the suspect data file to the computing device and/or to the user of the computing device, performing one or more computing activities on the suspect data file within the safety environment, the one or more computing activities configured to determine whether the suspect data file comprises code harmful to the computing device and/or the user;

analyzing, using safety analysis software, results of performing the one or more computing activities on the suspect data file;

providing, to the user and within the safety environment, results of the performing the one or more computing activities on the suspect data file;

sending a warning message in response to any of:

the pre-analysis;

the user; and the analysis from the safety analysis software of the results of performing the one or more computing activities on the suspect data file determining that the suspect data file is capable of causing harm to the computing device and/or the user;

receiving an exit signal to exit the safety environment, wherein the exit signal is capable of being generated:

by the user in response to the user determining that the results of the performing the one or more computing activities on the suspect data file are not indicative of causing harm to the computing device and/or to the user; and in response to the analysis of the results of the performing the one or more computing activities on the suspect data file not being indicative of causing harm to the computing device and/or to the user; and deactivating the safety environment in response to the exit signal.

2. The method of claim 1, further comprising isolating the suspect data file in the safety environment in response to a user action.

3. The method of claim 1, wherein the request from the user to start the safety environment comprises receiving an indication of the user one of selecting a soft key on an electronic display of the computing device and pressing a safe environment button, the safe environment button available on a user interface of the computing device and/or on a case of the computing device.

4. The method of claim 1, wherein the safety analysis software is configured to:

analyze results of performing the one or more computing activities on the suspect data file;

provide the indication that the results of performing the one or more computing activities on the suspect data file being indicative of not causing harm to the computing device and/or the user; and in response to the results being indicative of abnormal operation harmful to the computing device and/or the user:

provide, via the warning message, a warning that the suspect data file is not performing as expected, the warning provided to the user and/or to a system administrator; and/or disable further performing of computing activities on the suspect data file.

5. The method of claim 1, wherein the safety analysis software is configured to:

pre-analyze the suspect data file to determine harmful impacts of the suspect data file to the computing device and/or to the user prior to the performing the one or more computing activities on the suspect data file; and in response to the analysis of the suspect data file indicating potential harm to the computing device and/or the user:

provide, via the warning message, a warning that the suspect data file is harmful to the computing device and/or the user, the warning provided to the user and/or to a system administrator; and/or disable further performing of computing activities on the suspect data file.

6. The method of claim 1, wherein the safety environment comprises a virtual machine ("VM") that is operated on one of the computing device and a separate computing device accessible to the computing device, wherein the VM prevents actions resulting from the performing of the one or more computing activities from affecting the computing device and/or another user environment of the computing device.

7. The method of claim 1, wherein the safety environment executes on a separate computing device, wherein the separate computing device prevents actions resulting from the performing of the one or more computing activities from affecting the computing device and/or other computing devices.

8. The method of claim 1, wherein the safety environment enables one or more actions unavailable to the user in the safety environment prior to generating the safety environment, wherein the one or more actions comprising administrative actions available to a system administrator and unavailable to the user prior to generating the safety environment.

9. The method of claim 1, wherein the performing of the one or more computing activities on the suspect data file comprises receiving user input indicating the one or more computing activities to be performed and further user input indicating whether results of the performing of the one or more computing activities are indicative of causing harm to the computing device and/or the user.

10. The method of claim 1, wherein the receiving of the exit signal comprises receiving a command in response to an interactive query resulting from the performing of the computing activities on the suspect data file.

11. The method of claim 1, wherein the receiving of the exit signal comprises expiration of a timer related to inactivity in the safety environment, the expiration of the timer causing the exit signal.

12. The method of claim 1, wherein the detecting of the suspect data file comprises receiving a communication from the user that the suspect data file is suspected of comprising code harmful to the computing device and/or a user.

13. An apparatus comprising:

a processor; and non-transitory computer readable storage media storing code, the code being executable by the processor to perform operations comprising:

detecting, on a computing device, a suspect data file suspected of comprising code harmful to the computing device and/or a user of the computing device;

activating, in response to a request from the user, a safety environment accessible to the computing device, the safety environment isolated from a user environment of the computing device, wherein effects of accessing the suspect data file in the safety environment are isolated from the user environment of the computing device;

pre-analyzing, within the safety environment, the suspect data file to determine harmful impacts of the suspect data file to the computing device and/or to the user of the computing device;

in response to finding no harmful impacts of the suspect data file to the computing device and/or to the user of the computing device, performing one or more computing activities on the suspect data file within the safety environment, the one or more computing activities configured to determine whether the suspect data file comprises code harmful to the computing device and/or the user;

analyzing results of performing the one or more computing activities on the suspect data file;

providing, to the user and within the safety environment, results of the performing the one or more computing activities on the suspect data file;

sending a warning message in response to any of:

the pre-analysis;

the user; and the analysis of the results of performing the one or more computing activities on the suspect data file determining that the suspect data file is capable of causing harm to the computing device and/or the user;

receiving an exit signal to exit the safety environment, wherein the exit signal is capable of being generated:

by the user in response to the user determining that the results of the performing the one or more computing activities on the suspect data file are not indicative of causing harm to the computing device and/or to the user; and in response to the analysis of the results of the performing the one or more computing activities on the suspect data file not being indicative of causing harm to the computing device and/or to the user; and deactivating the safety environment in response to the exit signal.

14. The apparatus of claim 13, wherein the safety analysis software is configured to:

analyze results of performing the one or more computing activities on the suspect data file;

provide the indication that the results of performing the one or more computing activities on the suspect data file being indicative of not causing harm to the computing device and/or the user; and in response to the results being indicative of abnormal operation harmful to the computing device and/or the user:

provide, via the warning message, a warning that the suspect data file is not performing as expected, the warning provided to the user and/or to a system administrator; and/or disable further performing of computing activities on the suspect data file.

15. The apparatus of claim 13, wherein the safety analysis software is configured to:

pre-analyze the suspect data file to determine harmful impacts of the suspect data file to the computing device and/or to the user prior to the performing the one or more computing activities on the suspect data file; and in response to the analysis of the suspect data file indicating potential harm to the computing device and/or the user:

provide, via the warning message, a warning that the suspect data file is harmful to the computing device and/or the user, the warning provided to the user and/or to a system administrator; and/or disable further performing of computing activities on the suspect data file.

16. The apparatus of claim 13, wherein the safety environment comprises a virtual machine ("VM") that is operated on one of the computing device and a separate computing device accessible to the computing device, wherein the VM prevents actions resulting from the performing of the one or more computing activities from affecting the computing device and/or another user environment of the computing device.

17. The apparatus of claim 13, wherein the receiving of the exit signal comprises receiving a command in response to an interactive query resulting from the performing of the computing activities on the suspect data file.

18. A system comprising:

a computing device comprising a processor and non-transitory computer readable storage media storing code, the code being executable by the processor to perform operations comprising:

detecting, on the computing device, a suspect data file suspected of comprising code harmful to the computing device and/or a user of the computing device;

activating, in response to a request from the user, a safety environment accessible to the computing device, the safety environment isolated from a user environment of the computing device, wherein effects of accessing the suspect data file in the safety environment are isolated from the user environment of the computing device;

pre-analyzing, within the safety environment, the suspect data file to determine harmful impacts of the suspect data file to the computing device and/or to the user of the computing device;

in response to finding no harmful impacts of the suspect data file to the computing device and/or to the user of the computing device, performing one or more computing activities on the suspect data file within the safety environment, the one or more computing activities configured to determine whether the suspect data file comprises code harmful to the computing device and/or the user;

analyzing results of performing the one or more computing activities on the suspect data file;

providing, to the user and within the safety environment, results of the performing the one or more computing activities on the suspect data file;

sending a warning message in response to any of:

the pre-analysis;

the user; and the analysis of the results of performing the one or more computing activities on the suspect data file determining that the suspect data file is capable of causing harm to the computing device and/or the user;

receiving an exit signal to exit the safety environment, wherein the exit signal is capable of being generated:

by the user in response to the user determining that the results of the performing the one or more computing activities on the suspect data file are not indicative of causing harm to the computing device and/or to the user; and in response to the analysis of the results of the performing the one or more computing activities on the suspect data file not being indicative of causing harm to the computing device and/or to the user; and deactivating the safety environment in response to the exit signal.

* * * * *